United States Patent [19]

Cooperman et al.

[11] 4,163,427
[45] Aug. 7, 1979

[54] FREEZE-THAW INDICATOR APPARATUS

[76] Inventors: Isadore Cooperman; Morton Salkind, both of 62 Farms Rd., Freehold, N.J. 07728

[21] Appl. No.: 857,299

[22] Filed: Dec. 5, 1977

[51] Int. Cl.² ............................................. G01K 11/06
[52] U.S. Cl. .................................... 116/217; 73/358; 116/207
[58] Field of Search ............... 116/114.5, 217, 206, 116/207; 73/358; 426/88

[56] References Cited
U.S. PATENT DOCUMENTS

| 2,593,566 | 1/1949 | Kamp | 426/250 |
| 2,662,018 | 12/1953 | Smith | 73/358 X |
| 2,762,711 | 9/1956 | Zopf, Jr. | 116/114.5 X |
| 3,082,624 | 3/1963 | Renier | 73/358 X |
| 3,177,843 | 4/1965 | Geocaris | 116/114.5 |
| 3,220,259 | 11/1965 | Beyer | 116/114.5 X |
| 3,922,917 | 12/1975 | Ayres | 73/356 |
| 3,929,021 | 12/1975 | Pecorella | 73/358 X |
| 3,996,007 | 12/1976 | Fang et al. | 426/88 X |
| 4,022,149 | 5/1977 | Berger | 426/88 X |
| 4,038,873 | 8/1977 | Kimmel | 73/358 |

Primary Examiner—Daniel M. Yasich
Attorney, Agent, or Firm—Charles I. Brodsky

[57] ABSTRACT

Apparatus in which melting ice is used to activate a dye formation in producing a color indication of thawing.

15 Claims, 5 Drawing Figures

FREEZE-THAW INDICATOR APPARATUS

FIELD OF THE INVENTION

This invention relates to freeze-thaw indicator apparatus and, more particularly, to such apparatus as will indicate that items then in a frozen condition have previously been thawed.

BACKGROUND OF THE INVENTION

In the preparation and storage of foodstuffs, both raw and cooked, and both in the home and in the grocery store or supermarket, some manner of indication is desirable to indicate whether frozen items have previously been thawed. As will be apparent, such information is useful from health, safety, and nutritional standpoints. When it is considered that such items as blood, various medications, serums, culture plates, biologicals, etc., are also stored frozen, it not only is desirable to know that thawing has taken place, but essential to know such fact. Although the use of maximum-minimum thermometers can provide an indication that a frozen item had previously been thawed, the use of such apparatus with each and every item in the frozen food department of a grocery store or supermarket (or with each and every container of blood, drug, or other heat fragile item) is both totally impracticable and prohibitively costly.

SUMMARY OF THE INVENTION

As will become clear hereinafter, the freeze-thaw indicator apparatus of the present invention is inexpensive to manufacture, easy to use, and simple to understand. As will be seen, its operation is related to the ability of melting ice to activate an irreversible dye forming system while serving as an interface for the activating system when in the previous frozen state. Specifically, and in a preferred embodiment of the invention, no color is formed when the water is in its initial, frozen condition; but, as the surrounding temperatures increase to the point at which the ice begins to melt, a color change is produced as the dye ingredients mix with the water formed. By using dye ingredients which produce an irreversible chemical reaction when mixed with the melting ice, such color change subsists, even though the foodstuff, serum, medication, culture plate, biological or the like, is re-frozen. As will be appreciated by those skilled in the art, the freeze-thaw indicator apparatus to be described can be manufactured in strip form, and when taped to an item to be frozen, can provide a consumer with a simple color change indication that the item has, on at least one previous occasion, been thawed.

BRIEF DESCRIPTION OF THE DRAWING

These and other features of the invention will be more clearly understood when taken in connection with the accompanying drawing in which.

DETAILED DESCRIPTION OF THE DRAWING

Before proceeding to a detailed description of the freeze-thaw indicator apparatus embodying the invention, it will first be understood that each construction utilizes melting ice as an activator for the indication. As will be appreciated, when two dry, water soluble dye components are mixed together in absence of water, no dye results and no color is produced. Similarly, when these two components are mixed together in the presence of water in its frozen form (ice), no dye results either, and no color is produced. On the other hand, when the temperature rises and the ice begins to melt, the two components become solubilized in the water and form the dye which produces a visual color. By using components which produce an irreversible dye reaction, that color, once formed, remains, even if the surrounding temperatures are lowered and the water re-freezes once again. In this manner, the color indication subsists to provide the "thaw" information desirable and/or essential from health, safety and nutritional standpoints.

Figure 1:
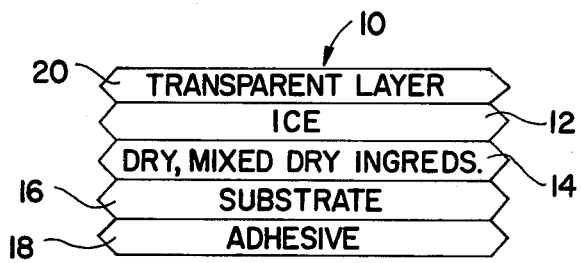
FIG. 1 illustrates a form of freeze-thaw indicator apparatus constructed in accordance with the present invention.

Referring now to the drawings, in FIG. 1, a strip of indicating tape 10 is shown as comprising an ice layer 12 immediately above a layer of dry, mixed dye ingredients 14. A white opaque substrate 16 extends beneath the layer 14—to provide a contrast to the color produced—with the opague substrate 16 being atop an adhesive layer 18 which affixes to the frozen foodstuff, blood container, serum package, or other item, in connection with which the indicator tape 10 is utilized. A transparent layer 20 overlies the ice layer 12 in completing the construction. As will be apparent, as the surrounding temperatures increase, the ice layer 12 begins to melt, and the solubilizing of the dye ingredients 14 in the resulting water initiates the activation to provide a color indication. As will be noted, prior to the melting of the ice, the dry mixed ingredients provide no dye formation and no color.

Figure 2:
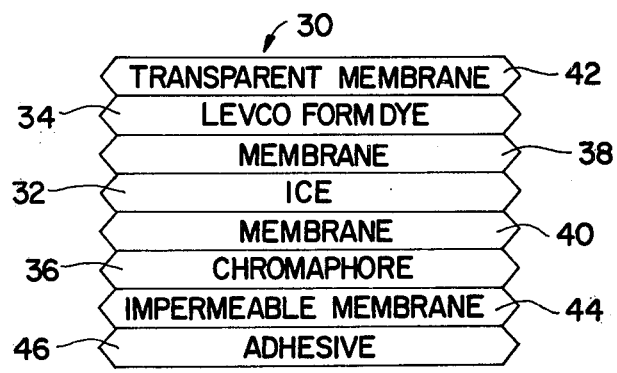
FIG. 2 illustrates a second form of freeze-thaw indicator apparatus according to the invention.

In the strip of indicating tape 30 of FIG. 2, an ice layer 32 is again utilized, but this time sandwiched between a layer of colorless dye in leuco form 34 and a layer of water soluble chromaphore 36. More specifically, a first, semi-permeable membrane 38 separates the dye layer 34 from the ice layer 32 while a second, semi-permeable membrane 40 separates the chromaphore layer 36 from the ice layer 32. A transparent, impermeable membrane 42 overlies the dye layer 34 while a second, impermeable membrane 44 underlies the chromaphore layer 36, which, with a contact adhesive backing 46, serves to affix the tape 30 to the frozen foodstuff, serum container, etc.

Figure 3:
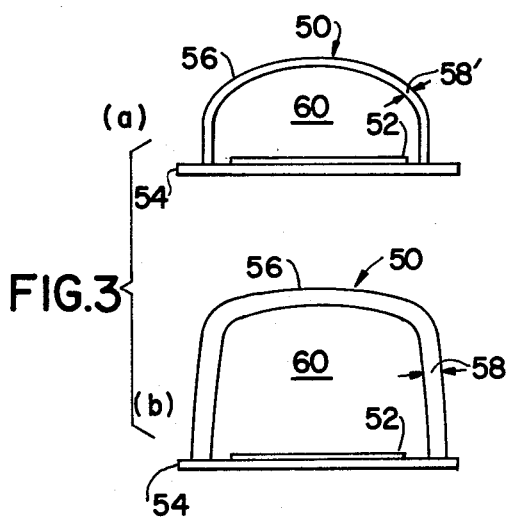
FIG. 3a and 3b illustrates a third form of the invention.

As will be apparent in this embodiment of the invention, as long as the multi-layer tape 30 and the item to which it is affixed are kept frozen, no color is produced. If the item then thaws, the tape 30 shows a color indication because the melting ice mixes with the leuco dye 34 and the chromaphore 36. By utilizing the appropriate leuco dye 34 and chromaphore 36 the dye formation could be made irreversible, to continue the color indication unaffected by any subsequent re-freezing of the item. In this regard, it will be understood that by adjusting the thicknesses of the semi-permeable membranes 38, 40, and by selecting their individual compositions, the heat transfer rate can be controlled to permit some degree of thawing before any dye formation and color are produced. As will be readily apparent, this is of particular importance in both the FIG. 1 and FIG. 2 embodiments, in order to permit handling of the indicator tapes without disturbing the ice layers. Unless some manner of controlling heat transfer is provided, the mere handling of the indicator tapes—manufactured "cold" of necessity to provide the ice layer—, could, of itself, produce such a temperature rise as would cause a melting of the ice and an initiation of the dye forming process. Also, this arrangement could be used where the stored item need only be refrigerated, rather than frozen; as with the "plastic bubble" embodiment described with respect to FIG. 3 of the drawing, the membranes 38, 40 could be selected to insulate the ice layer 32 against melting until the surrounding temperatures rise above a predetermined level—50° F., for instance.

On the other hand, if water insoluble membranes which are frangible under pressure conditions are used, then the indicator tape could be manufactured under other than "cold" conditions—for example, at temperatures in excess of 32° F. or at room temperature. A pair of such membranes could be filled with water, and as the foodstuff, blood, serum, etc. is frozen with the tape affixed, the water turns to ice, expands, and cracks the enclosing evelope into the dye and chromaphore layers. As long as the foodstuff, blood, serum, etc., remains frozen, no dye is formed and no color results. However, once the item begins to thaw, the ice also beings to thaw, and the resulting water seeps through the cracked envelope to solubilize the leuco dye and chromaphore components and produce the color indication. As will be apparent, this arrangement could be utilized in a construction like that of FIG. 1, where the water-filled encapsulating envelope replaces the ice layer 12, as well as with a construction like that of FIG. 2, where the water-filled encapsulating envelope replaces the layers 38, 32, 40.

Alternatively, the ice layer 32 of this last arrangement could be replaced by an absorbent material which was previously saturated with water at room temperature but allowed to drain completely. At this temperature, the absorbent material is in dry form, and when frozen along with the foodstuff, blood, serum, etc., the water within its pores expands as ice to crack the envelope encapsulation and mix with the dye and chromaphore layers 34, 36. On subsequent thawing, the melting ice solubilizes the dye ingredients to produce the resulting color indication. As will be apparent, this arrangement could also be utilized as in the FIG. 1 embodiment, with the absorbent material replacing the ice layer 12.

In the manufacture of the foregoing embodiments of this invenion, a number of dye techniques are possible. For example, the dye ingredients 34, 36 could comprise dry litmus and a dry acid which becomes active in the presence of water, such as tartaric acid or citric acid. Or, starch and potassium iodide could be utilized to provide a purple-black color in the presence of water. Also, phenalphthalein could be employed—along with sodium bicarbonate, potassium tartrate, magnesium citrate, potassium citrate, sodium citrate, etc.—in forming the complex which produces a color change in the presence of a water activator. The semi-permeable membranes 38, 40 could be constructed of a polyurethane, or of a cellulose acetate type material, while the encapsulating, frangible material could comprise a gelatin, polyvinyl alcohol, polyvinyl pyrrolidone, celluloid or phenal formaldehyde. The absorbent material which is saturated with water at room temperature could comprise a silica gel, a polyurethane sponge, carbon-black, or most other materials which are microporous and which will retain water in their structures. Other such indicators, as well as the use of them to provide visual detection, are described at pages 548-561 of Kirk-Othmer's Encyclopedia of Chemical Technology (1966), Volume 11.

Another embodiment of the invention which permits handling at room temperatures is illustrated in FIGS. 3a and 3b as comprising a plastic bubble 50 enclosing the indicator spot 52, manufactured of the dye ingredients and the adjacent ice in any of the aforedescribed manners. The indicator spot 52 overlies a contact adhesive layer 54, and is in turn encased by the bubble layer 56 of a thickness 58 and insulating air space 60. In this version, both the composition and thickness of the bubble layer 56 and the volume of the insulating air 60 determine the rate at which the indicator spot 52 thaws to provide the dye formation and color indication. As will be apparent, a thinner bubble layer 58 (FIG. 3a) results in a faster thawing for the same volume of air 60, while a larger volume of air 60 (FIG. 3b) leads to a slower thawing for the same bubble thickness 58. With this arrangement, a frozen item could thus be taken out of a freezer chest, compartment, etc. and into a warmer environment, without necessarily undergoing a thawing. Once it is kept out for too long a period of time, however, the heat transferred to the indicator spot 52 begins to melt the included ice, and the color indication is thereby produced. Such "bubbles" are available from the Sealed Air Corporation of New Jersey, and are described in such references as U.S. Pat. Nos. 3,285,793, 3,294,387 and 3,294,389.

Figure 4:
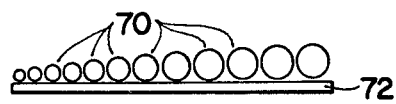
FIG. 4 shows another form of apparatus embodying the invention.
Figure 5:
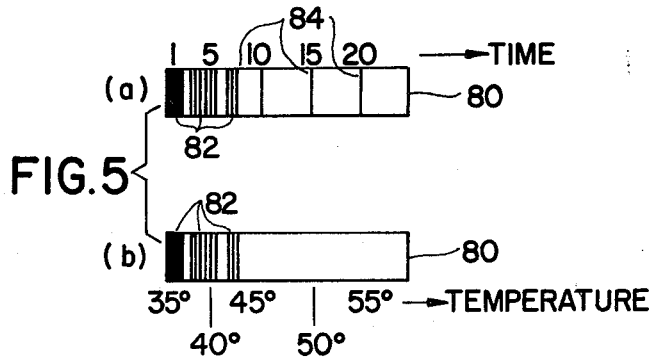
FIG. 5a and 5b is a visual representation helpful in an understanding of one embodiment of this invention.

In certain applications, furthermore, it might be useful to know not only that the item that once was frozen has thawed, but also to what temperature (or temperature range) it thawed, or for how long it was thawed at that temperature. Such indications are useful in determining the potency, viability or the edibility of that item. To provide the indication as to what temperature was reached, a series of microcapsular wax mixtures could be employed, each enclosing a different indicator spot of dye ingredients and ice, and each formulated to have different melting points. A series of hue or chromatic color indications are produced as different ones of the microcapsular mixtures melt in turn as temperatures rise. For example, upon reaching a first temperature, an irreversible dye formation could be produced to yield a "blue" color indication, while at a second, elevated temperature, a different, irreversible dye formation could be produced to yield a "green" color indication. Also, by varying the thicknesses of a series of plastic bubbles of the type previously described, but with each enclosing an indicator spot of the same dye ingredients, the time of thawing could be determined by the position of the resulting color on a linear indicator strip. Such an arrangement is shown in FIG. 4 where the plastic bubbles 70 increase in thickness from left-to-right in the drawing, to illustrate an increased time of thawing as the dye indications proceed in that direction. (For purposes of simplification, only the bubbles 70 and contact adhesive 72 are illustrated.) The representation of FIG. 5a shows that the tape 80 could be calibrated along a side to indicate the time at which the thawing or color production 84 occurred, e.g., after one minute, five minutes, 10 minutes, etc. Similar calibrations could also be used where different dye ingredients are employed (as by the different shadings of 82 of FIG. 5b), to indicate the temperature to which the item thawed. A first encapsulant construction could be used, for example, to melt at 50° F., thereby releasing its entrapped water to form a first dye color, a second encapsulant could then be used to melt at 60° F., where its entrapped water mixes to form a second dye, etc. The subject of microencapsulation—including discussions of size, strength, permeability, release of contents and manufacturing processes—can be found at pages 436–456 of Kirk-Othmer's Encyclopedia of Chemical Technology (1966), Volume 13. The use of gelatin as such an encapsulant is described at pages 458–460, Volume 7, of such reference work.

(In all the foregoing embodiments, it will be apparent that all that need be done to utilize the invention is to affix a length of the indicating tape strip to the item to be frozen. Merely noting the color of the strip, then, would tell whether any thawing had taken place to produce the dye formation and color indication. Thus, not only will the indicator apparatus of the present invention be inexpensive to manufacture and easy to apply, but simple to understand in its usage.)

While there have been described what are considered to be preferred embodiments of the present invention, it will be appreciated that modifications may be made by those skilled in the art without departing from the teachings of the invention of using water as an activator to indicate thawing through the use of dye formation and resulting color production. For at least such reason, therefore, reference should be had to the claims appended hereto for an understanding of the true scope of this invention.

We claim:

1. Freeze-thaw indicator apparatus comprising a plurality of frangible microcapsules, individual ones of which enclose water soluble dye formers mixed in dry form and individual others of which enclose colorless water in liquid form, said dye former and water enclosing microcapsules being securedly positioned on a indicia support such that as surrounding temperatures decrease to freeze the water in liquid form, the ice which is produced causes rupture of its own enclosing microcapsule and that of dye former enclosing microcapsules adjacent to it, and such that as surrounding temperatures thereafter increase above freezing, the ice which melts flows through the ruptures in said water enclosing and adjacent dye former enclosing microcapsules to solubilize the dye formers in dry form to provide a colored dye and a visual indication thereof, with selected ones of said water enclosing microcapsules and selected ones of said dye former enclosing microcapsules being predeterminedly positioned proximate each other and sized of predetermined different construction so as to exhibit a predetermined degree of responsiveness to decreases and increases in surrounding temperature in providing said colored dye and said visual indications, and with said selected water enclosing and dye former enclosing frangible microcapsules providing said visual indications on said support representative of the surrounding temperature to which all of said water enclosing and dye former enclosing frangible microcapsules are subjected and the length of time to which all of said frangible microcapsules are kept at said temperature.

2. The apparatus of claim 1 wherein said selected ones of said dye former and water enclosing microcapsules are operative in providing said visual indication when all of said water enclosing and dye former enclosing frangible microcapsules are subjected to a first surrounding temperature, and wherein selected others of said dye former and water enclosing microcapsules are operative in providing said visual indication when all of said water enclosing and dye former enclosing frangible microcapsules are subjected to a second surrounding temperature.

3. The apparatus of claim 1 wherein said second surrounding temperature is higher above the freezing temperature of said water in liquid form than is said first surrounding temperature.

4. The apparatus of claim 1 wherein said second surrounding temperature is lower below the freezing temperature of said water in liquid form than is said first surrounding temperature.

5. The apparatus of claim 1 wherein said selected ones of said dye former and water enclosing microcapsules are operative in providing a visual indication of a given color when all of said water enclosing and dye former enclosing frangible microcapsules are subjected to said first surrounding temperature and wherein said selected others of said dye former and water enclosing microcapsules are operative in providing a visual indication of another color when all of said water enclosing and dye former enclosing frangible microcapsules are subjected to said second surrounding temperature.

6. The apparatus of claim 1 wherein said selected ones of said dye former and water enclosing microcapsules are operative in providing said visual indication when all of said water enclosing and dye former enclosing frangible microcapsules are subjected to a first surrounding temperature range, and wherein selected others of said dye former and water enclosing microcapsules are operative in providing said visual indication when all of said water enclosing and dye former enclosing frangible microcapsules are subjected to a second surrounding temperature range.

7. The apparatus of claim 1 wherein said selected ones of said dye former and water enclosing microcapsules are operative in providing said visual indication when all of said water enclosing and dye former enclosing frangible microcapsules are subjected to a given temperature for a first length of time, and wherein selected others of said dye former and water enclosing microcapsules are operative in providing said visual indication when all of said water enclosing and dye former enclosing frangible microcapsules are subjected to said temperature for a second length of time.

8. The apparatus of claim 7 wherein said second length of time is of greater duration than said first length of time.

9. The apparatus of claim 1 wherein said selected ones of said dye former and water enclosing microcapsules are constructed of a wall composition different from that of the remaining others of said dye former and water enclosing microcapsules.

10. The apparatus of claim 1 wherein said selected ones of said dye former and water enclosing microcapsules are constructed of a wall thickness different from that of the remaining others of said dye former and water enclosing microcapsules.

11. The apparatus of claim 1 wherein said selected ones of said dye former and water enclosing microcapsules are constructed to enclose volumes of air insulation different from volumes of air insulation enclosed by the remaining other of said dye former and water enclosing microcapsules.

12. The apparatus of claim 1 wherein said selected ones of said water enclosing microcapsules are constructed to enclose different volumes of water than are enclosed by the remaining other of said water enclosing microcapsules.

13. The apparatus of claim 1 wherein said dye formers in dry form are solubilized to a given dye condition by the ice which melts and flows through said ruptures, which condition is not reversed by any subsequent decrease in surrounding temperatures.

14. The apparatus of claim 13 wherein said selected ones of said dye former and water enclosing microcapsules are predeterminedly positioned proximate each other in strip format, and wherein said strip is calibrated along a side thereof to indicate the surrounding temperatures to which all of said frangible microcapsules are subjected.

15. The apparatus of claim 13 wherein said selected ones of said dye former and water enclosing microcapsules are predeterminedly positioned proximate each other in strip format, and wherein said strip is calibrated along a side thereof to indicate the lengths of time to which all of said frangible microcapsules are kept at said temperatures.

* * * * *